(12) United States Patent
Shieh et al.

(10) Patent No.: US 7,762,158 B2
(45) Date of Patent: Jul. 27, 2010

(54) SELF-LOCKING DEVICE FOR A TABLE ELEVATING SCREW

(75) Inventors: Wu-Teng Shieh, Taichung (TW); Yu-Shan Lee, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 921 days.

(21) Appl. No.: 11/561,383

(22) Filed: Nov. 18, 2006

(65) Prior Publication Data
US 2008/0116428 A1 May 22, 2008

(51) Int. Cl.
*G05G 1/04* (2006.01)
(52) U.S. Cl. .............................. 74/526; 74/519; 74/523
(58) Field of Classification Search ..................... 74/37, 74/39, 89, 89.44, 813 R, 519, 526, 523, 567; 248/188.2, 188.4, 346.05; 184/5; 173/216; 188/69; 73/838; 82/160; 279/156
See application file for complete search history.

(56) References Cited
U.S. PATENT DOCUMENTS

| | | | | | |
|---|---|---|---|---|---|
| 888,619 | A | * | 5/1908 | Kelly | ........................ 74/89.44 |
| 1,413,305 | A | * | 4/1922 | Webb | .......................... 73/838 |
| 2,366,079 | A | * | 12/1944 | Wilson | ......................... 188/69 |
| 2,546,655 | A | * | 3/1951 | Shaler | ......................... 173/216 |
| 3,608,915 | A | * | 9/1971 | Hohwart | ...................... 279/156 |
| 4,644,825 | A | * | 2/1987 | Yamazaki | ................. 74/813 R |
| 5,183,272 | A | * | 2/1993 | Tyvela | ......................... 279/156 |
| 6,571,671 | B1 | * | 6/2003 | Giannetti | ...................... 82/160 |
| 6,752,245 | B2 | * | 6/2004 | Tsukada et al. | ................. 184/5 |

* cited by examiner

*Primary Examiner*—Vinh T. Luong
(74) *Attorney, Agent, or Firm*—Chun-Ming Shih

(57) ABSTRACT

A self-locking device for a table elevating screw includes a rotatable disk disposed on a screw having a nut thereon, a wedged body disposed on the rotatable disk, an outer cover moveably disposed on the rotatable disk and the wedged body and a stop plate disposed on the outer cover. When the rotatable disk rotates in relation to the screw in a direction or a reverse direction, the wedged body ascends or descends in relation to the rotatable disk, maintaining a gap between the stop plate and the outer cover or generating a frictional force therebetween. By the frictional force occurred when the screw rotates in a single direction, the self-locking device can achieve a precise self-locking device for the screw in a lifting/lowering positioning task.

7 Claims, 13 Drawing Sheets

SELF-LOCKING DEVICE FOR A TABLE ELEVATING SCREW

BACKGROUND OF THE INVENTION

1. Field of the Invention

The present invention relates to a self-locking device for a table elevating screw, with which a nut of the screw is prevented from dropping down when a power associated is removed or disappeared.

2. Description of the Prior Art

Lifting and lowering operations are generally involved in mechanical devices. For the most part, the lifting and lowering operations are achieved pneumatically and hydraulically for the current mechanical devices. However, since the pneumatic and hydraulic mechanisms are susceptible to the physical factors of pressure and temperature, the objects lifted and lowered are difficult to be well positioned, apt to shift, and moved without good self-locking result, fine precision and proper reliability. Further, such pneumatic and hydraulic mechanisms are difficult to be designed. The pneumatic and hydraulic mechanisms can only provide a vertical positioning operation and require various peripheral elements and components for maintenance use. Accordingly, the pneumatic and hydraulic mechanisms cannot provide a good and convenient lifting and lowering operation.

In a hoist or an elevator, a braking or self-locking device has to be provided for the screw in prevention of dropping down of the nut of the screw when a power associated is removed or disappeared.

In the U.S. pat. No. 2,804,053, an actuator was disclosed, which comprises a hydraulic cylinder, a piston, a screw and a braking assembly. Hydraulic oil is instilled from an upper hydraulic entrance and a lower hydraulic entrance so as to cause the piston to ascend and descend. Meanwhile, the vertical movement of the piston also brings the screw to rotate. The braking assembly provides a braking operation by the hydraulic pressure. When the actuator is in a stop state, the braking assembly is operated to be in a locking state. When the actuator is ready to move, the braking assembly is operated to be in a release state. However, complex peripheral devices are required to control the hydraulic system to have a self-locking result.

In view of the above demerits encountered in the prior art, the inventors sets forth a simple and precise self-locking device, with which the issues of difficult positioning, inconvenient installation and poor self-locking performance can be successfully overcome, effectively promoting convenience and use of the mechanical lifting and lowering mechanisms.

SUMMARY OF THE INVENTION

Therefore, the present invention is to provide a self-locking device for a lifting/rising screw, in which only simple elements are involved to achieve a precise self-locking function for the screw by means of friction forces occurred between elements when the screw is rotated in a single direction.

In accordance with the present invention, the self-locking device for a table elevating screw comprise a rotatable disk having a plurality of guide bevels thereon, wherein each adjacent two of the plurality of guide bevels has a stop bump therebetween; a wedge body has an upper surface being a frictional surface and a lower surface being a sliding surface, wherein the sliding surface is amounted on the guide bevel; an outer cover is disposed on the wedge body; and a stop plate is disposed over the outer cover with a gap, wherein when the rotatable disk rotates in a direction, the wedge bump is elevated from a low position to a high position along the guide bevel to cause the plurality of wedge bumps to bring the outer cover to rise with the frictional surface thereof, so as to generate a sliding friction between the outer cover and the stop plate to limit the table elevating screw from rotating, while when the rotatable disk rotates in the other direction, the wedge bump is lowered from the high position to the low position to cause the outer cover to move downwards and maintain a gap between the outer cover and the stop plate, so as to rotate the table elevating screw, wherein the frictional force existing between the guide bevel of the rotatable disk and the wedged body is less than the frictional force provided between the inner surface of the outer cover and the frictional surface of the wedge body.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 1:
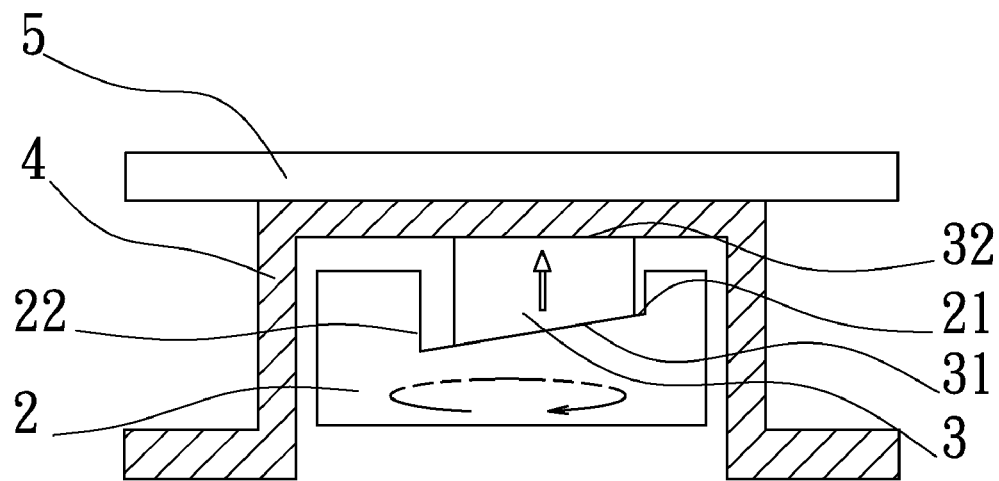
FIG. 1 is a cross sectional view of a self-locking device in a self-locking state according to the present invention.
Figure 3:
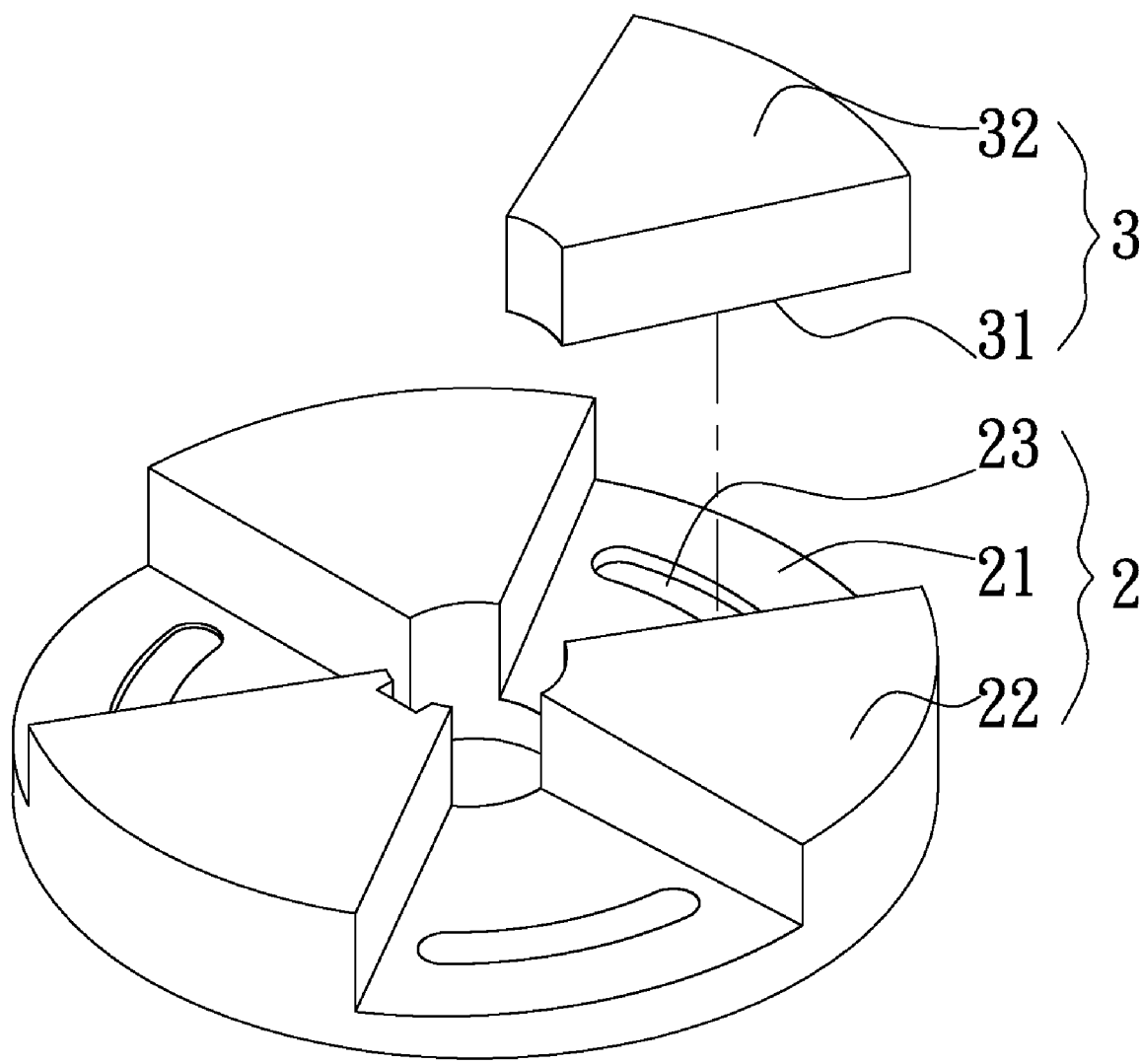
FIG. 3 is a schematic diagram of a partial structure of the self-locking device according to the present invention.

Referring to FIG. 1 and FIG. 3, a self-locking device of the present invention comprises a rotatable disk 2, a wedged bump 3, an outer cover 4 and a stop plate 5.

The rotatable disk 2 is shaped like a disk and has a plurality of (al least two) guide bevels 21 thereon. Between two adjacent ones of the plurality of guide bevels 21, there is a stop body 22 formed for isolation thereof.

The wedged body 3 is substantially shaped like a conical body, and has an upper surface being a frictional surface 3 1 and a lower surface being a sliding surface 32. The wedged body 3 is disposed on the guide bevel 21 with its sliding surface 32 contacted with the guide bevel 21. In this manner, the wedged body 3 is slid able on the guide bevel 21.

The outer cover 4 is substantially shaped like a cover body and disposed on a top surface of the wedged body 3 for covering the rotatable disk 2 and the wedged body 3. The out cover 4 has a center and the rotatable disk 2 has an axial center, which are provided in correspondence with each other. In this manner, the outer cover 4 may move freely along the axial center of the rotatable disk 2. The outer cover 4 further has an inner surface, which is closely contacted with the wedged body 3 so that the sliding surface 32 and the frictional surface 31 are sandwiched between the rotatable disk 2 and the outer cover 4, respectively.

Figure 2:
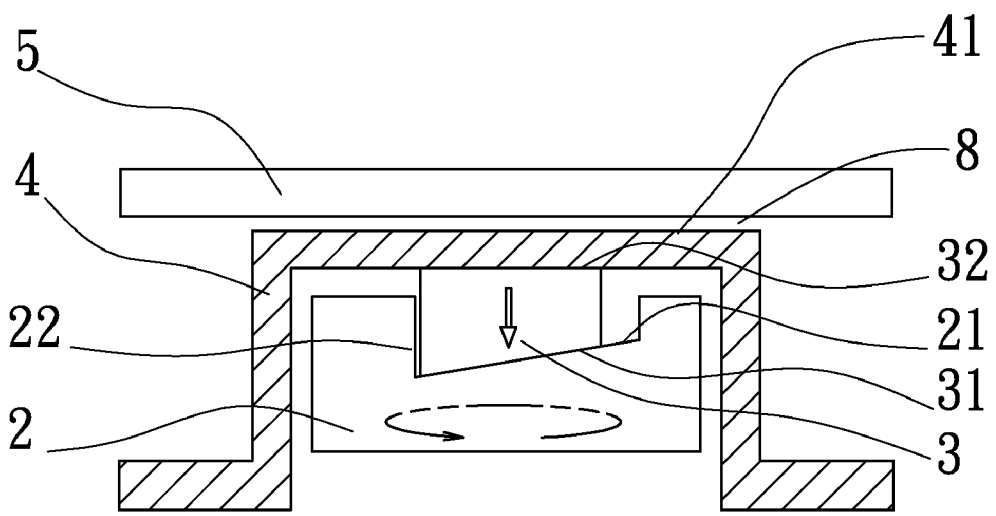
FIG. 2 is a cross sectional view of the self-locking device in a non-self-locking state according to the present invention.

The stop plate 5 is fixedly disposed on a top surface 41 of the outer cover 4. The stop plate 5 may be disposed at a position with a gap 8 maintained between the stop plate 5 and the outer cover 4 so that the stop plate 5 is in a free state. Alternatively, the stop plate 5 may be disposed so that it is closely contacted with the stop plate 5 with a friction occurring there between, referred to herein as a contacting state. As such, when the rotatable disk 2 rotates in a direction, the stop plate 5 is completely contacted with the outer cover 4, forming a self-locking state (refer to FIG. 1). On the other hand when the rotatable disk 2 rotates in a reverse direction, a gap 8 is maintained between the stop plate 5 and the outer cover 4 (refer to FIG. 2).

By means of the rotation of the rotatable disk 2 in the two directions, the wedged body 3 is caused to slide along the guide bevel 21 of the rotatable disk 2 upwards or downwards, and the outer cover 4 is brought to move upwards or downwards by the motion of the wedged body 3. When the outer cover 4 moves, it maintains the state of having a gap existing with respect to the stop plate 5 or being contacted with the stop plate 5 with a friction therebetween.

That is, when the rotatable disk 2 rotates in a positive direction (refer to FIG. 1), the wedged body 3 slides upwards from a low position (a lowest position) to a high position (a highest position), causing the plurality of wedged body 3 to bring the outer cover 4 to elevate with the frictional surface 31 and then urge the stop plate 5. Since a sliding friction is provided between the outer cover 4 and the stop plate 5, the rotation of the outer cover 4 can be limited, achieving the self-locking result.

On the other hand, when the rotatable disk 2 rotates in the reverse direction (refer to FIG. 2), the wedged body 3 is caused to descend from a high position (a highest position) to a low position (a lowest position) on the guide bevel 21 of the rotatable disk 2. At this time, the outer cover 4 moves downwards and maintains a gap with respect to the top plate 5, further bringing the screw 11 to rotate.

In addition, the frictional force existing between the guide bevel 21 of the rotatable disk 2 and the wedged body 3 may be less than the frictional force provided between the inner surface of the outer cover 4 and the frictional surface 31 of the wedge body 3.

The structure of the rotatable disk and wedged body of the self-locking device may have other embodiments, which will be described with reference to FIG. 4 to FIG. 12.

Figure 4:
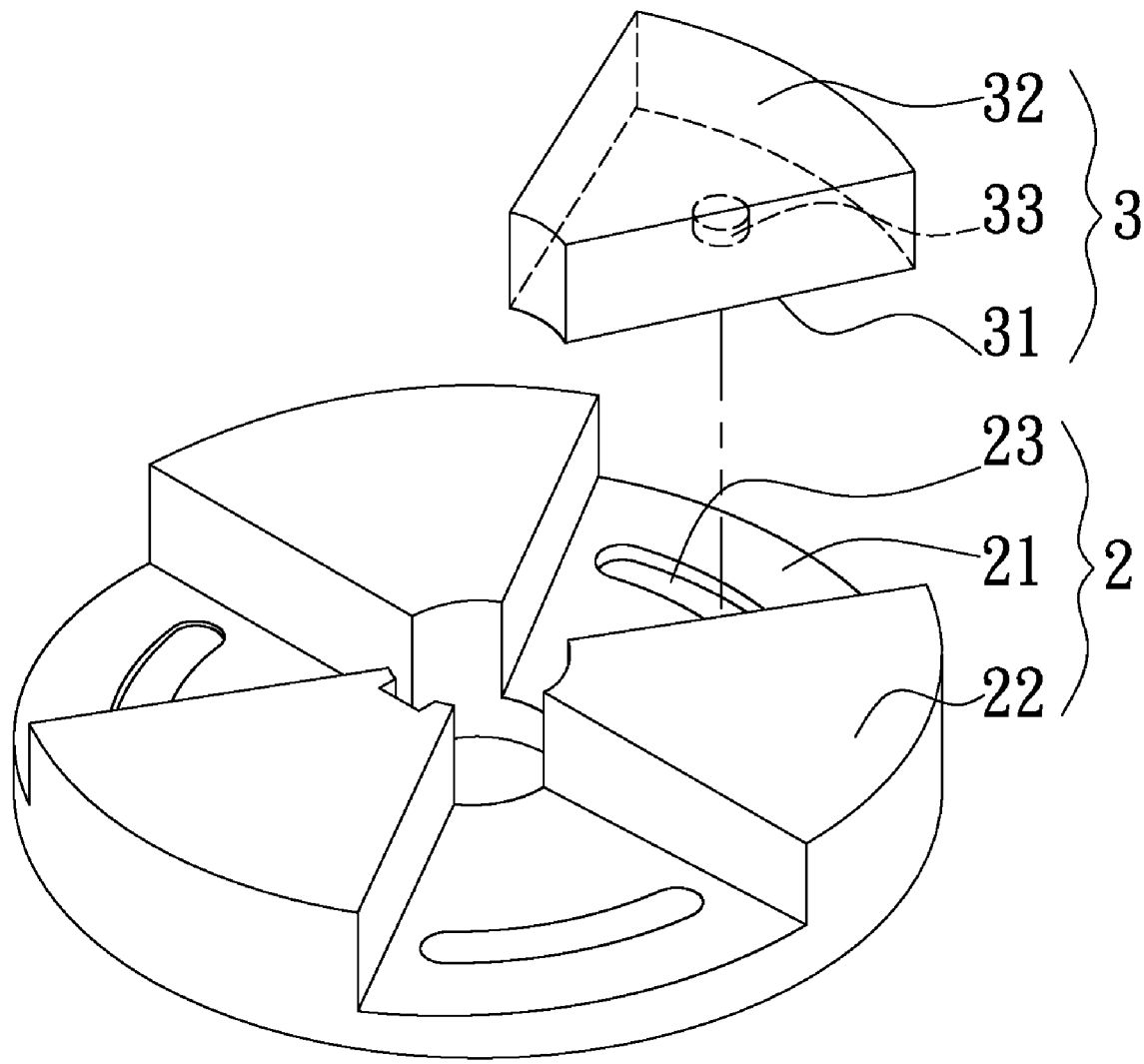
FIG. 4 is a perspective view of the self-locking device according to the present invention.
Figure 5:
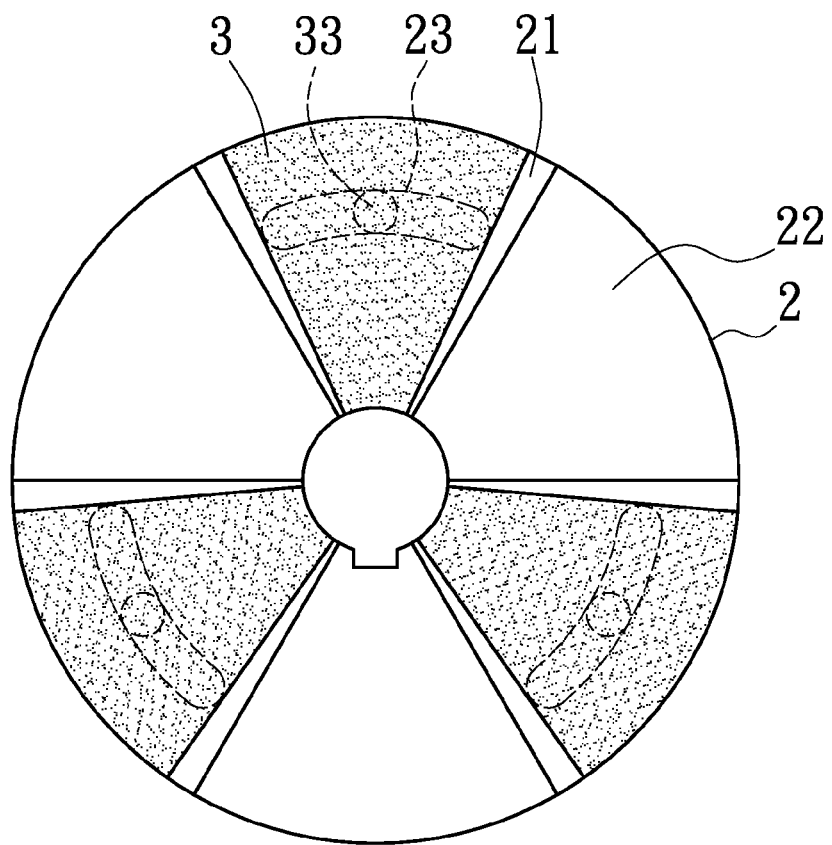
FIG. 5 is a top view of the self-locking device according to the present invention.
Figure 6:
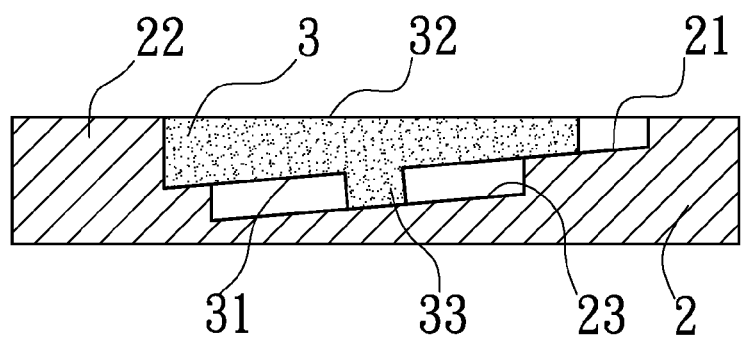
FIG. 6 is a partial view of another structure of the self-locking device according to the present invention.
Figure 7:
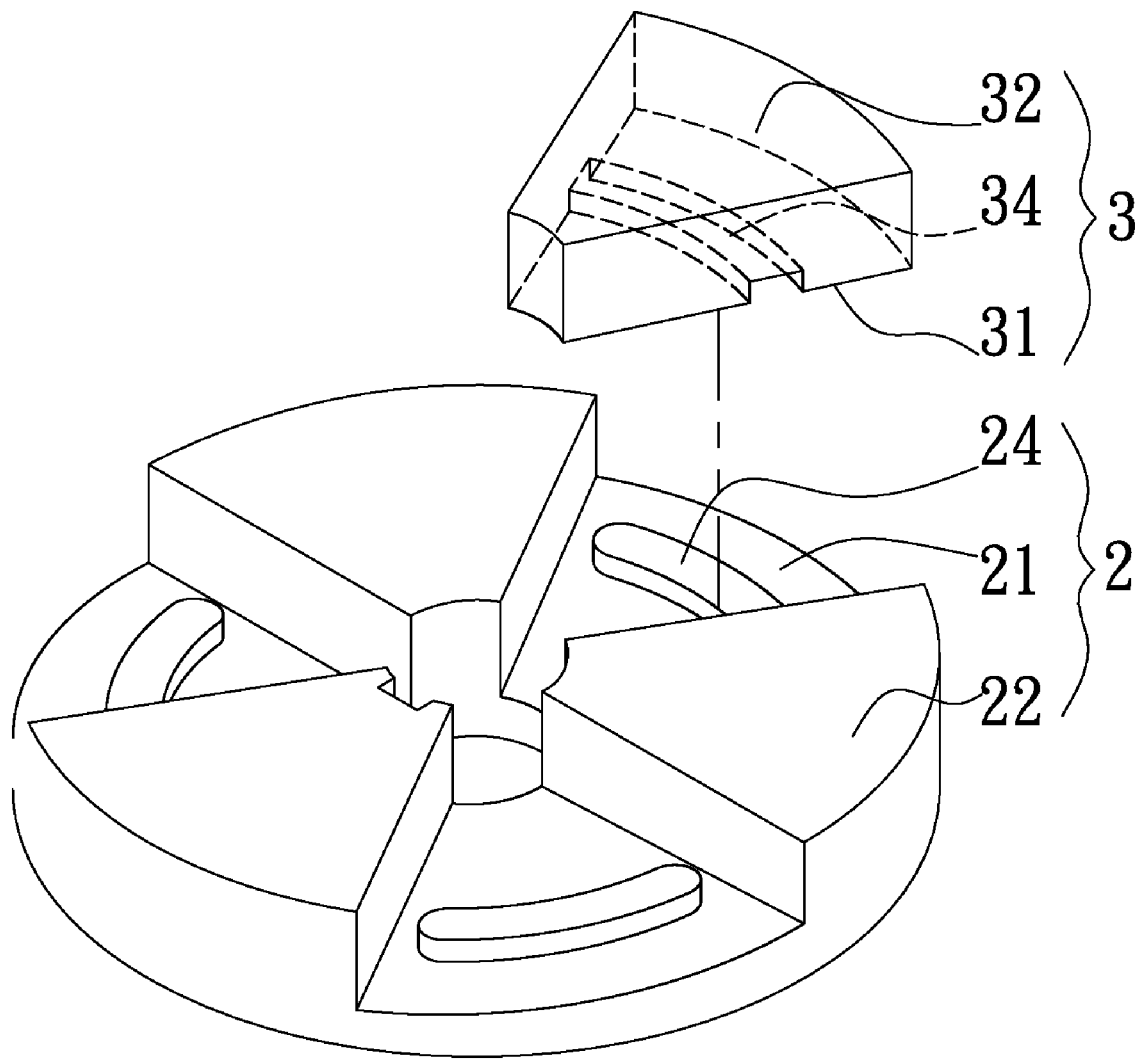
FIG. 7 is a perspective diagram of yet another structure of the self-locking device according to the present invention.
Figure 8:
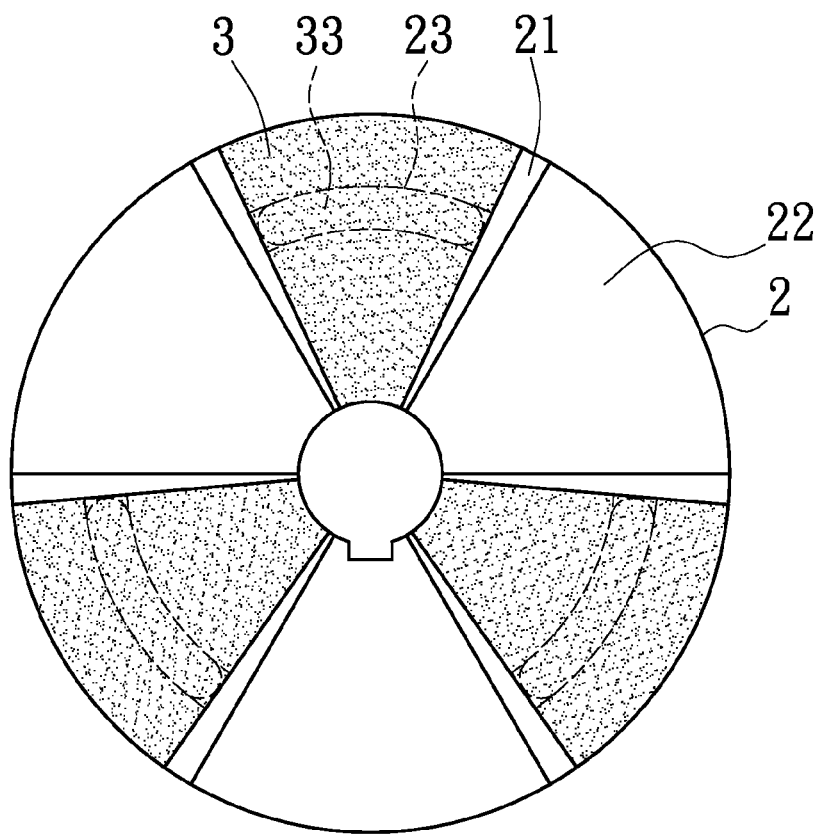
FIG. 8 is a top view of yet another structure of the self-locking device according to the present invention.
Figure 9:
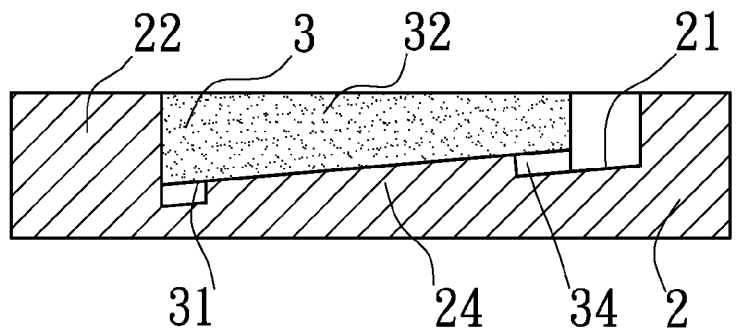
FIG. 9 is a partial view of yet another structure of the self-locking device according to the present invention.

Referring to FIG. 4 and FIG. 9, a protrusion-and-indentation mating structure is provided between the guide bevel 21 of the rotatable disk 2 and the sliding surface 32 of the wedged body 3 with the required frictional force maintained. That is, a concaved rail 23 (or a protruding sliding bump 24, shown in FIG. 7) may be provided on the guide bevel 21 of the rotatable disk 2 while a protruding bump 33 (or a concaved rail 34, shown in FIG. 7) is formed on the sliding surface 32 of the wedged body 3. As such, the rotatable disk 2 and the wedged body 3 are less likely to be worn down by each other.

Figure 10:
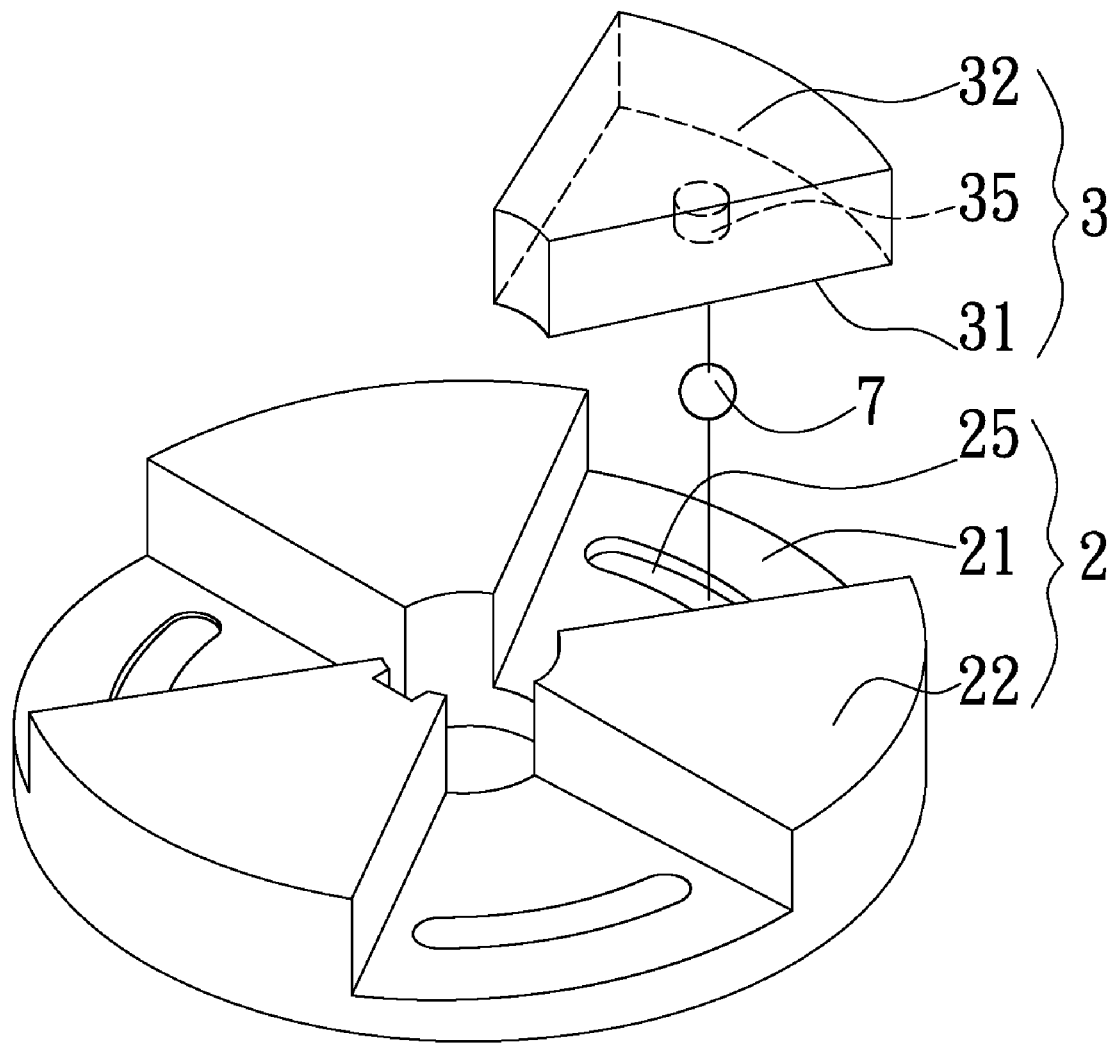
FIG. 10 is a perspective diagram of still another structure of the self-locking device according to the present invention.
Figure 11:
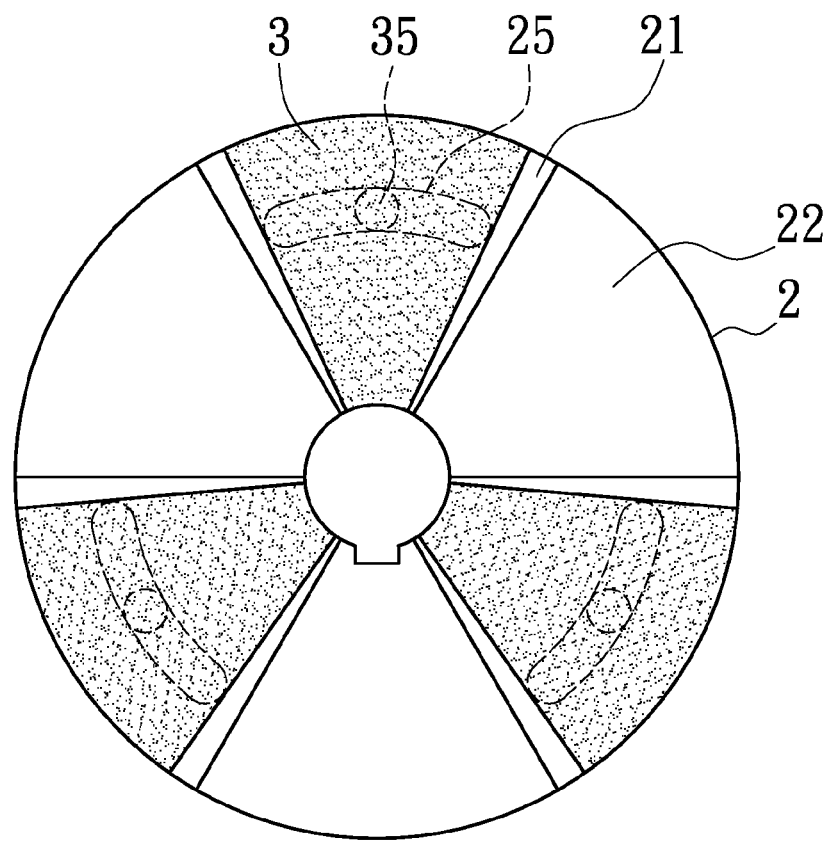
FIG. 11 is a top view of still another structure of the self-locking device according to the present invention.
Figure 12:
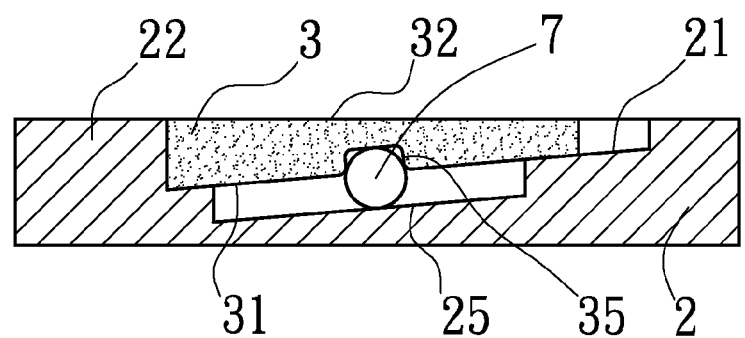
FIG. 12 is a partial view of still another structure of the self-locking device according to the present invention.
Figure 13:
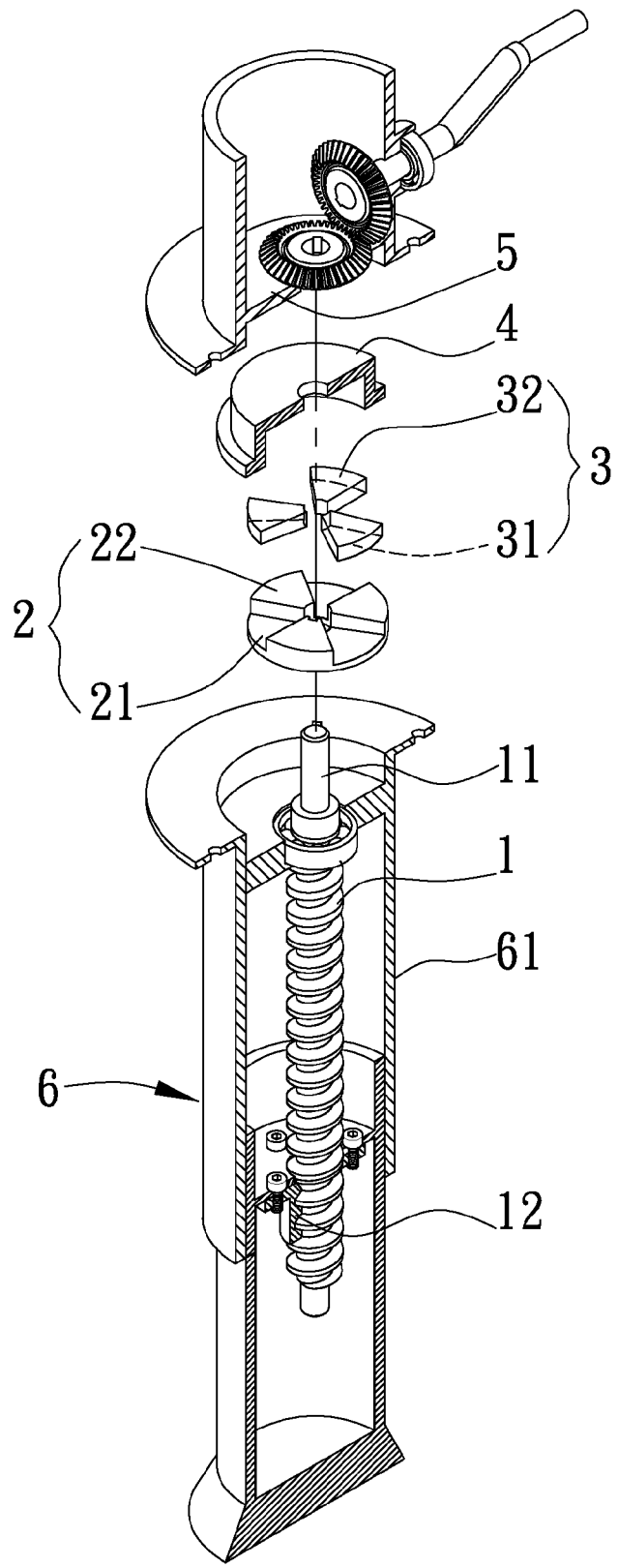
FIG. 13 is an exploded view of the table elevating screw with the self-locking device applied thereto according to the present invention.
Figure 14:
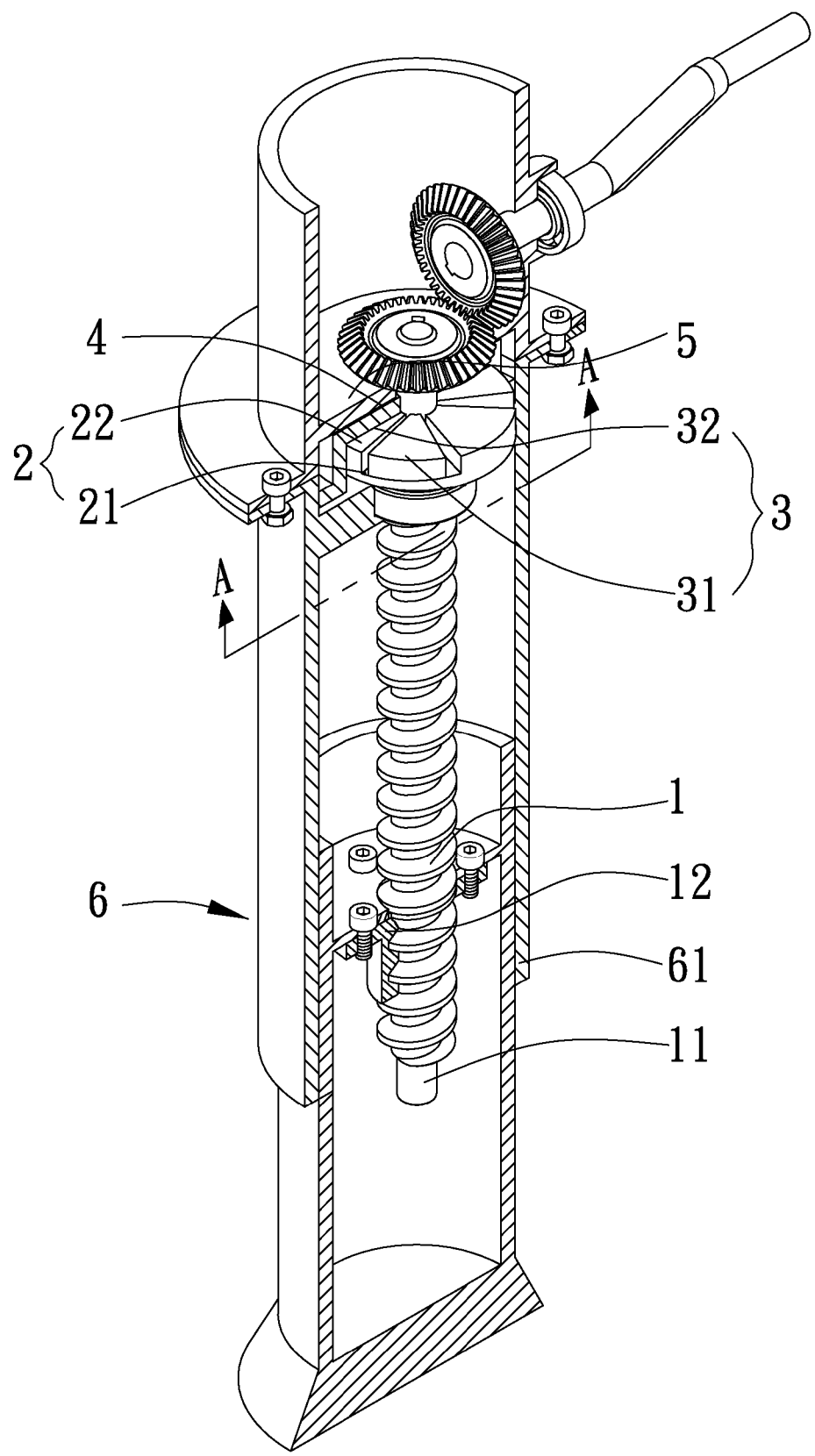
FIG. 14 is a assembly view of FIG. 13.
Figure 15:
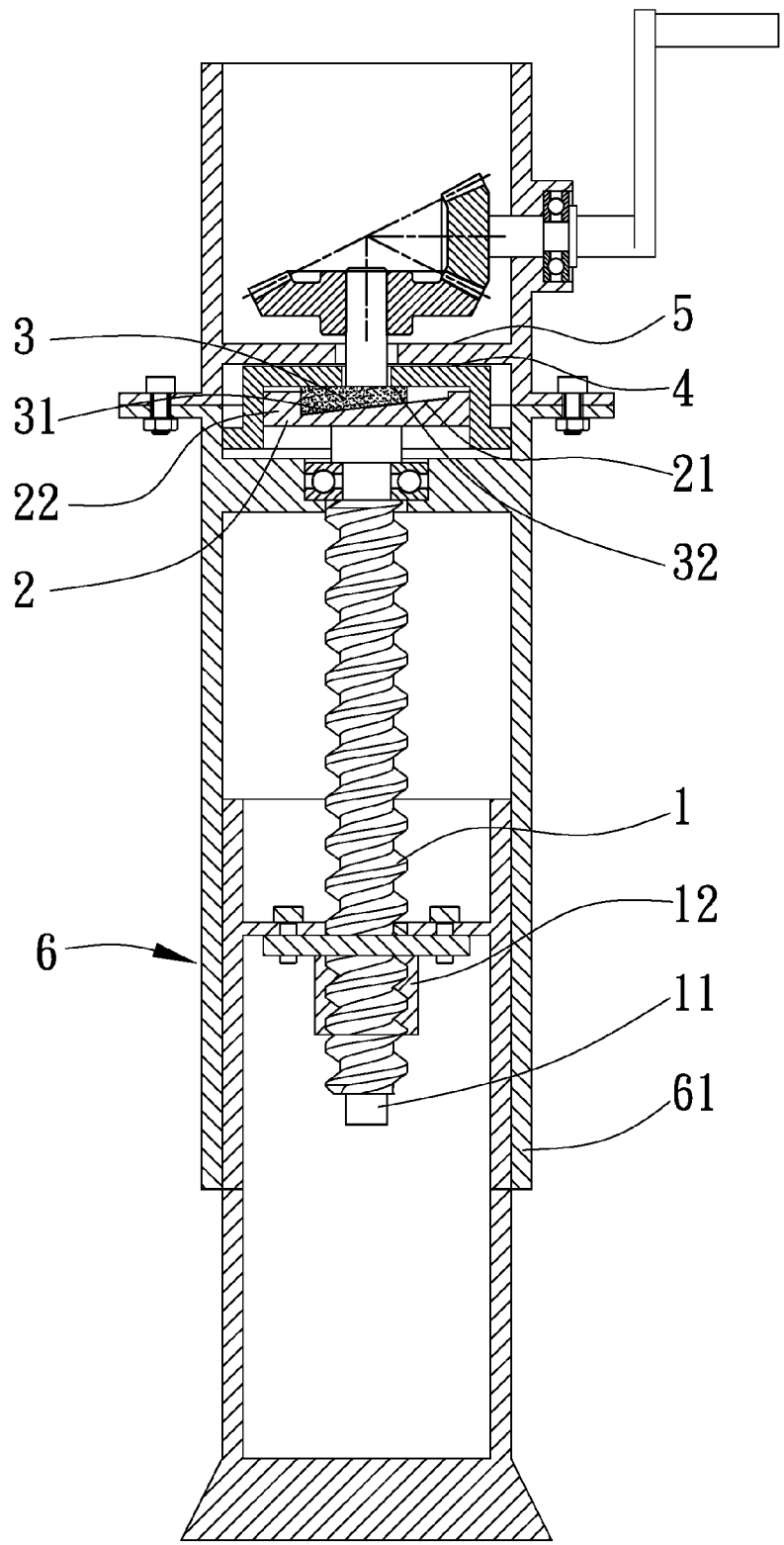
FIG. 15 is a cross sectional view along line A-A of FIG. 14.

Referring to FIG. 10 to FIG. 12, a concaved structure is formed on both of the guide bevel 21 of the rotatable disk 2 and the sliding surface 32 of the wedged body 3, indicated as 25 and 35. Between the concaved structures 25, 35, a bead 7 is disposed. As such, a frictional force is presented between the concaved structures 25, 35, effectively reducing possibility of worn-down of the rotatable disk 2 and the wedged body 3.

Referring to FIG. 13 to FIG. 17, the self-locking device of the present invention is applied to a lifting/lowering mechanism 6 for a table elevating screw 1. The lifting/lowering mechanism 6 comprises a screw shaft 11 having thread circumferentially formed and a nut 12 having thread at an inner side thereof. The screw shaft 11 and the nut 12 are provided so that they can be connected together.

The self-locking device of the present invention may be implemented in the lifting/lowering mechanism 6 as described follows.

The rotatable disk 2 may be fixed over a combination of a lifting/lowering member 61 of the lifting/lowering mechanism 6 and the screw shaft 11.

The wedged body 3 may be slid ably disposed on the guide bevel 21 of the rotatable disk 2.

The outer cover 4 is provided to cover the rotatable disk 2 and the wedged body 3. A through-hole (without labeled) is formed on the rotatable disk 2 for penetration of the screw shaft 11. In this manner, the outer cover 4 can move freely along an axial direction of the screw shaft 11.

The stop plate 5 is disposed over the outer cover 4 and fixed on the lifting/lowering member 6 for assembling the screw shaft 11 through a center 51 of the top plate 5.

Figure 16:
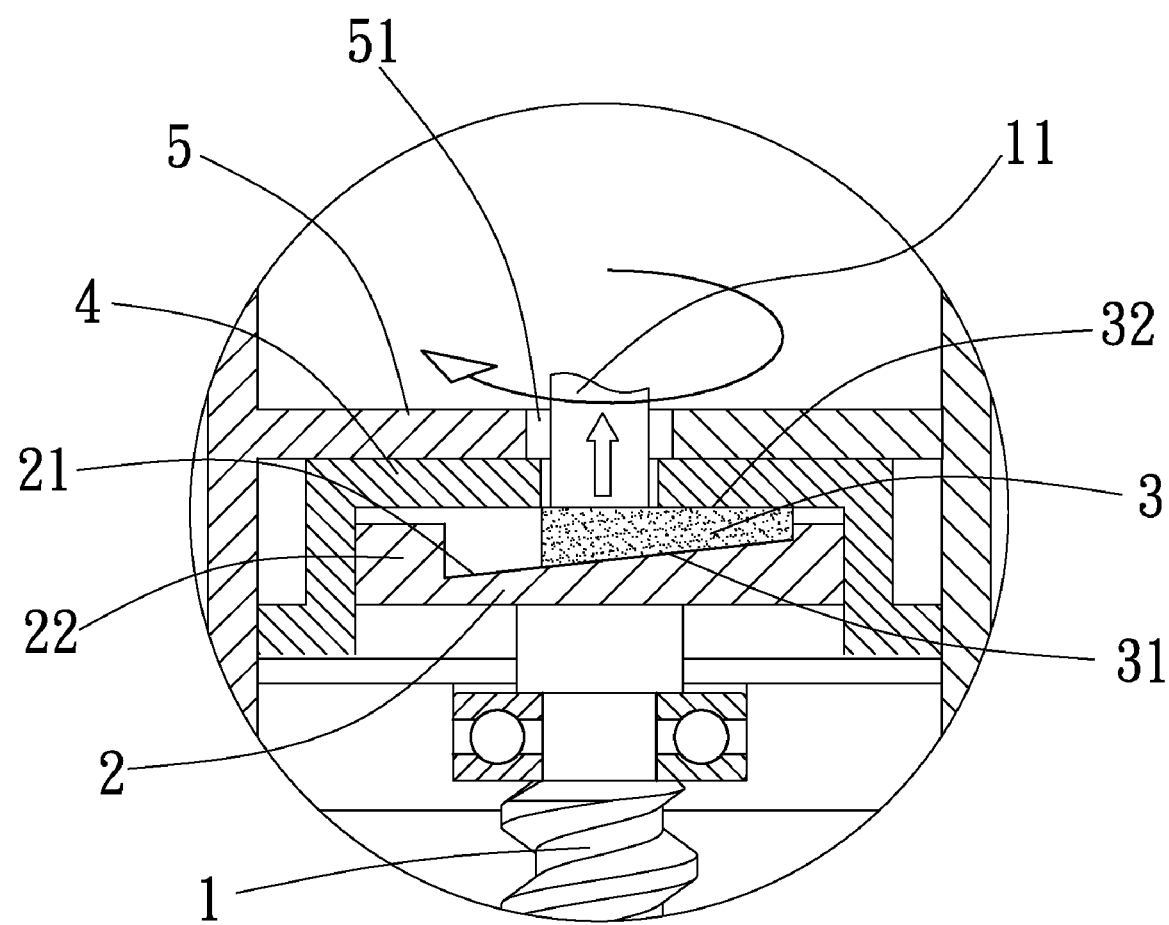
FIG. 16 is a diagram depicting a self-locking state of the table elevating screw with the self-locking device applied thereto according to the present invention.

Referring to FIG. 16, when the table elevating screw 1 rotates in a positive direction on the lifting/lowering mechanism 6, i.e. the rotatable disk 2 is brought to rotate in the positive direction by the table elevating screw 1, a sliding friction is presented between the stop plate 5 and the outer cover 4. At this time, the screw shaft 11 is limited in rotation and a self-locking state is occurred.

Figure 17:
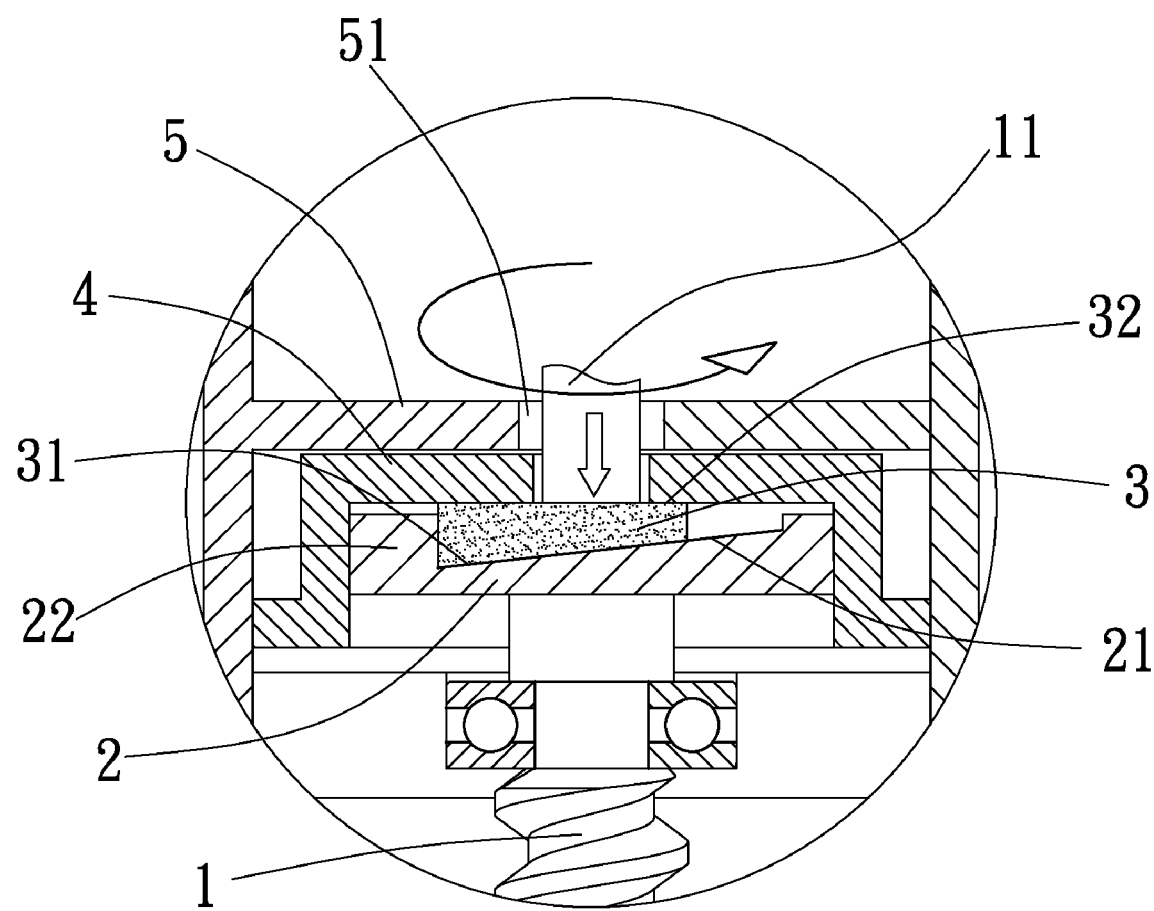
FIG. 17 is a diagram depicting a non-self-locking state of the table elevating screw with the self-locking device applied thereto according to the present invention.

Referring to FIG. 17, when the table elevating screw 1 is operated to rotate in a reversing direction in the lifting/lowering mechanism 6, i.e. the rotatable disk 2 is brought to rotate in the reversing direction by the screw shaft 11, a gap may be maintained between the stop plate 5 and the outer cover 4. At this time, the screw shaft 11 is further caused to rotate, which brings the lifting/lowering mechanism 6 to providing the lifting and lowering operations.

In the above described self-locking device, the wedged body 3 can slide on the guide bevel 21 of the rotatable disk 2 no matter when the screw shaft 11 rotates in the positive or reverse direction, which brings the outer cover 4 to move upwards or downwards and thus the outer cover 4 maintains a gap with respect to the stop plate 5 or is closely contacted with the stop plate 5 with a friction occurring therebetween.

The self-locking device for the table elevating screw has the following features and efficacies. 1. A simple self-locking structure is achieved, where the rotatable, wedged body, outer cover and stop plate are comprised, in contrast to the conventional locking mechanism where a hydraulic or pneumatic system is involved and complex peripheral elements are required, effectively saving the manufacturing cost therefore and thus promoting convenience and use thereof. 2. The self-locking state of the screw can be precisely achieved by controlling the reaction between the outer cover and the stop plate by the wedged body on the rotatable disk, effectively exempting the screw nut from dropping downwards and achieving the purposes of vertical positioning and self-locking effect in a single direction.

In conclusion, the self-locking device for the table elevating screw is not only simple in structure but also capable of providing a precise self-locking function in a single direction by means of the friction occurring when the rotatable disk is brought to rotate by the screw shaft, effectively overcoming the issues and disadvantages inherent in the prior art, where a hydraulic or pneumatic system is involved and particularly qualifying itself as a means for precisely positioning a table elevating screw.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A self-locking device for a table elevating screw, comprising:
   a rotatable disk having a plurality of guide bevels thereon, wherein each adjacent two of the plurality of guide bevels has a stop body therebetween;
   a wedged body having an upper surface being a frictional surface and a lower surface being a sliding surface, wherein the sliding surface is mounted on the guide bevel;
   an outer cover disposed over a top surface of the wedged body; and
   a stop plate disposed on a top surface of the outer cover in a contacting or free state and having a center connected to a screw shaft.

2. The self-locking device as claimed in claim 1, wherein the outer cover has an inner surface closely contacted with the wedged body so that the sliding surface and the frictional surface of the wedged body are sandwiched between the rotatable disk and the outer cover.

3. The self-locking device as claimed in claim 1, wherein a first friction force is occurred between the guide bevel of the rotatable disk and the sliding surface of the wedged body and a second friction force is occurred between the inner surface of the outer cover and the frictional surface of the wedged body, wherein the first friction force is less than the second friction force.

4. The self-locking device as claimed in claim 1, wherein the guide bevel of the rotatable disk has a concaved rail thereon and the sliding surface of the wedged body has a protruding sliding bump thereon, wherein the concaved rail and the protruding sliding bump are mated with each other.

5. The self-locking device as claimed in claim 1, wherein the guide bevel of the rotatable disk has a protruding sliding bump thereon and the sliding surface of the wedged body has a concaved rail thereon, wherein the concaved rail and the protruding sliding bump are mated with each other.

6. The self-locking device as claimed in claim 1, wherein each of the guide bevels of the rotatable disk and the sliding surface of the wedged body has a concaved structure thereon, wherein a bead is disposed between the respective concaved structures.

7. The self-locking device as claimed in claim 1, wherein when the rotatable disk rotates in a direction, the wedged body is elevated from a low position to a high position along the guide bevel to cause the wedged body to bring the outer cover to rise with the frictional surface thereof, so as to generate a sliding friction between the outer cover and the stop plate to limit the table elevating screw from rotating, while when the rotatable disk rotates in the other direction, the wedged body is lowered from the high position to the low position to cause the outer cover to move downwards and maintain a gap between the outer cover and the stop plate, so as to rotate the table elevating screw.

* * * * *